United States Patent Office 3,003,021
Patented Oct. 3, 1961

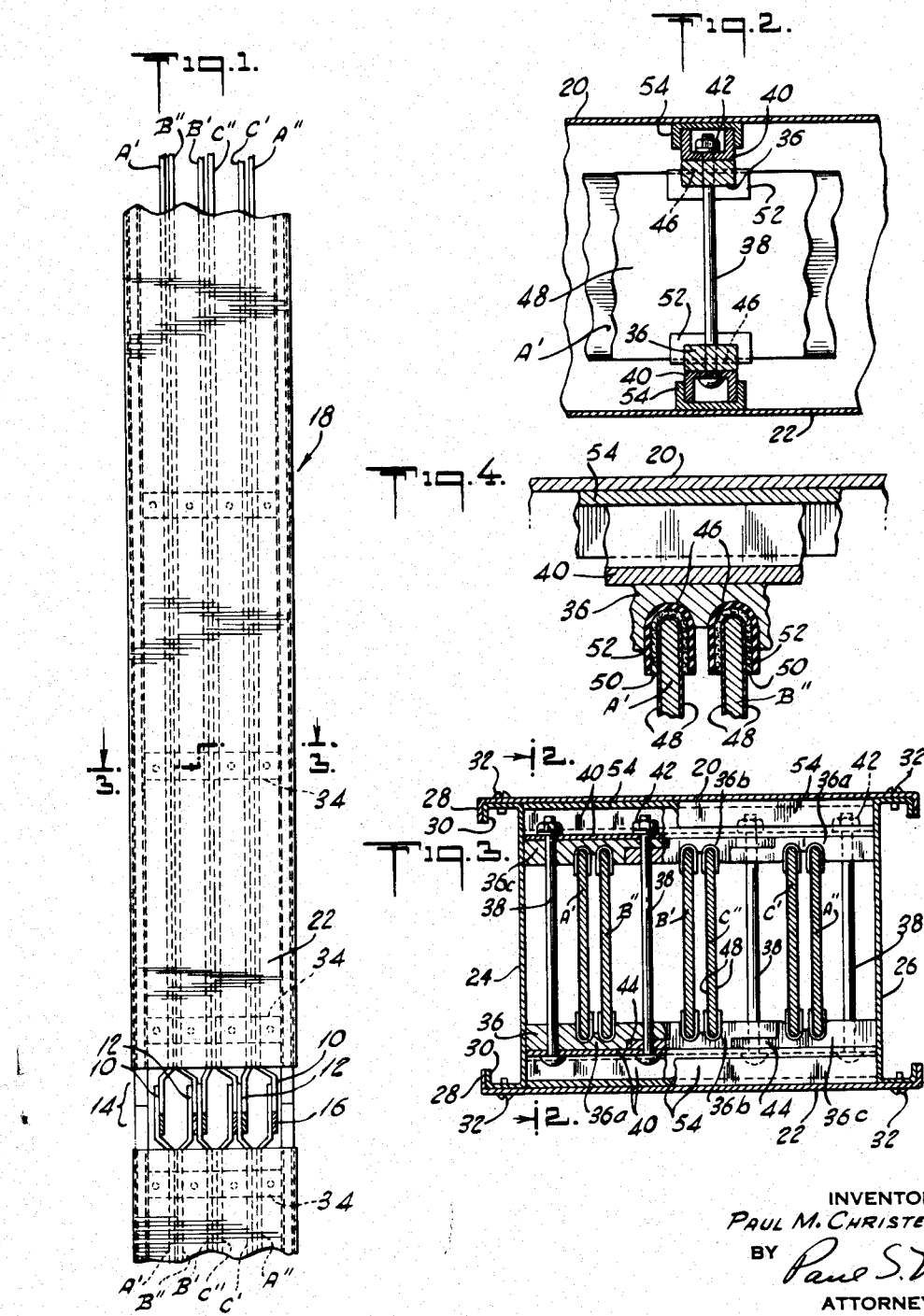

3,003,021
BUS DUCT
Paul M. Christensen, West Orange, N.J., assignor to Federal Pacific Electric Company, a corporation of Delaware
Original application Aug. 30, 1956, Ser. No. 607,028, now Patent No. 2,966,540, dated Dec. 27, 1960. Divided and this application Mar. 3, 1960, Ser. No. 15,022
7 Claims. (Cl. 174—99)

The present application relates to bus duct, being an assembly of heavy bus bars for carrying current of large values. This application is a division of my application Ser. No. 607,028 filed August 30, 1956 now Patent No. 2,966,540.

One object of the present invention is to provide an assembly of bus bars with new and effective mechanical supporting and electrical insulating arrangements, and, more specifically, an assembly of bus bars having common supporting means fixing their arrangement and at the same time insulating the bars from each other so as to enable operation of the bars at different voltages.

Distribution bus bars are commonly required to be enclosed in a protective metal duct. Accordingly, a further object of the present invention is to provide a novel bus duct, including a duct containing distribution bars, where the bus bars are mechanically held in assembly and electrically insulated from each other, by novel means contained in the duct, where such means does not depend upon the enclosing duct to hold the bus bars in the required assembly.

Bus duct frequently extends horizontally from the input power source such as a transformer, to various distribution points along a horizontal run. The run may branch from point to point. The bus duct also may be used as a riser, as in a building having multiple stories. In such installations, tap-offs may be made at the various floors. In vertical installations, the enclosing duct may be fixed against vertical shifting by external fastening means; and in such installations, in accordance with a further feature of the invention, means is provided for preventing longitudinal shifting of the bus bars within the duct and thereby providing mechanical support for the vertical bus bars. It is important for the bars to be fixed against longitudinal shifting for a further reason. Bus duct is manufactured in unit lengths, ordinarily of 10 ft. each, and the ends of the bus bars should be fixed in position, in relation to each other and in relation to the ends of the enclosing duct, whether the duct is installed horizontally or vertically. Bus duct characteristically is intended for heavy currents. Where heavy currents are carried over any substantial length of duct, there is a possibility of a serious voltage drop developing because of the reactance of the bus bars. In accordance with a further feature of the invention, the lengths of bus duct are made of bars assembled in closely spaced pairs, where the pairs are spaced relatively far from each other, and where the bars of the run are interconnected at their ends in a way to form loops in which currents can be induced such that the usual high magnetic fields and the reactance associated with the bars are minimized. The bars may be for single phase; or they may be for three-phase in which case there would be two bars per phase, or four or six bars per phase.

At the ends of the unit-lengths of bus duct, where each length joins another, the individual bus bars are bent into positions that do not maintain the paired-phase relationship but, instead, the ends are spaced in a way to enable the individual bars of each length to be joined to the corresponding bars of the next length of duct. A further feature of the present invention resides in the connection between successive lengths of bus-duct in such way as to enable tap-offs to be made conveniently at the time that the bus duct is being installed, and in such way as to enable tap-offs to be made in the future without separating or removing any of the installed bus duct. By virtue of the novel arrangement, new tap-offs are readily made, easily and directly.

Further features of the invention and its other aspects and advantages will become clear from the following detailed disclosure of an illustrative embodiment shown in the accompanying drawings. In those drawings FIG. 1 is a side view of a portion of a vertical run of bus duct, with a cover plate removed to reveal a connection between two unit-lengths of bus duct;

FIG. 2 is an enlarged cross-section along the line 2—2 of FIG. 3, and

FIG. 3 is an enlarged cross-section of a duct in FIG. 1 along the line 3—3 therein; and FIG. 4 is an enlarged detail of FIG. 3.

Referring now to the drawings, six bus bars are shown enclosed within a metal duct. The bus bars are ordinarily of copper or aluminum, and the enclosing duct is ordinarily of sheet iron, which may or may not be liberally perforated for improved ventilation. The six bus bars shown are designated A', B'', B', C'', C' and A'', these letters being representative of the three input terminals of a three-phase source, A, B and C; and the bar designations also represent three terminals A, B and C of the load and of each tap-off. It will be understood that at the source, and at each tap-off or load, the bus bars are connected to each other so that bars A' and A'' are joined to provide a single terminal A; bars B' and B'' present a single terminal B, and bars C' and C'' present a single terminal C. Bars A' and B'' are close to each other. Similarly bars B' and C'' form a second pair, and C' and A'' form a third pair. The pairs of bars may be spaced from each other by 2 inches, with ¼ inch bars 2 inches in width being separated by a face-to-face distance of ¼ inch within the pair, in an example. This arrangement gives a low-reactance characteristic as contrasted with three heavy conductors A, B and C which might be enclosed in a duct and spaced from each other by the same two inches that is here provided between the pairs. The end above-mentioned connections form short-circuit loops for circulating current that tends to minimize the magnetic fields about the bars and thereby to minimize reactance.

A bus duct is divided into even lengths, for example, ten feet, in order that the individual lengths may be assembled where manufactured and may be transported in units whose weight is not excessive for handling. In FIG. 1, two such unit-lengths are shown joined to each other by a connection which appears at the bottom of the figure. Corresponding conductors of the bottom unit-length of duct are joined to like bars of the upper section. Furthermore, the conductors B' and B'' are joined to each other. Where conductors A' and A'' of the two units are joined, there is a lap joint 10 involving two conductors at each joint. Four conductors overlap where conductors B' and B'' of one unit-length of duct are joined to conductors B' and B'' of the other unit length of duct, and similarly a four-conductor lap joint 12 is formed for the conductors C' and C''. These joints are made by means of bolts and nuts (not shown) which are inserted in the spaces provided between the several joints 10 and 12, and they extend so as to occupy a part of that space.

The various conductors within the length of duct illustrated have offset end portions where these lap-joints are to be formed. The lower ends of the conductors in the upper unit length of duct (FIG. 1) are formed with only enough longitudinally extending metal to provide this lap-joint; but the conductors of the lower unit length of duct as illustrated have end portions 14 of sufficient length to form the lap-joints 10 and 12 and additionally for tap-off lap joints. The tap-off conductors 16, shown in cross-section in FIG. 1, extend at right angles to the view and are joined to the conductors of the lower length of bus duct by means of nuts and bolts or by any other suitable fastening means. Where nuts and bolts or like fastening devices are used, appropriate formations are provided in the joint-forming areas of the bars for such fastening devices. The right-angled tap-off conductors 16 extend either into the ends of branch distribution bus ducts, or to the terminals of other forms of loads. The ends of the bus bars of each unit length of duct are in alignment transverse of the duct as are the overlap connections 10 and 12 and the tap-off connections 16. Each such connection has adequate mechanical and insulating clearance from all the other connections.

As shown in FIGURES 1 and 3, the conductors are enclosed in a sheet metal duct 18 having top and bottom covers 20 and 22, and side members 24 and 26 formed as channels. Covers 20 and 22 have in-turned edges 28 which overlie edges 30 of side members 24 and 26. Suitable fastening devices 32 unite the enclosing duct into a rigid assembly. As seen in FIGURE 1, side members 24 and 26 are of greater length than the cover 20. This enables the unit lengths of duct to be assembled with the conductors in overlapped relation and with the channel members 24 and 26 in abutting relationship, with the overlapped end portions of the conductors exposed for access. Where no tap-off is made, the opening left by cover 20 of the duct is then covered by a suitable cover plate. Where conductors 16 of a tap-off or of an input or terminal junction is formed, then a branch duct is naturally provided.

Each of the six conductors in the three-phase distribution duct illustrated actually carries current of its own unique phase relative to the currents in the other conductors, and each is insulated from the others and from the enclosing duct. (The foregoing statement is true despite the connections 12 shown between the pair of "B" conductors and the pair of "C" conductors respectively, but the theoretical explanation of that phenomenon is omitted as unnecessary to an understanding of the present invention.) Means is provided for holding the bus bars in proper spaced relationship from the covers and side walls of the duct 20, 22, 24, and 26, and to maintain the conductors in their proper spaced arrangement, previously described, while providing the insulation necessary to sustain the phase relationships that are developed between the currents of the several bars. This means includes a series of supporting frames 34, of a form such as that illustrated in FIGURES 2 and 3. As seen particularly in FIGURE 2, a pair of members 36 are disposed at opposite edges of conductor A', these members gripping that bus bar by virtue of clamping bolts 38 that extend through suitable bores in both members 36. A pair of channels 40 extend along the respective members 36 to provide recesses for receiving the nuts and the heads of bolts 38. Advantageously, the recess which receives nut 32 should be formed complementary to that nut so as to prevent it from turning when the bolt is being tightened. Where the channel 40 is used, and therefore has a continuous longitudinal recess, the width of the channel is made only slightly larger than the nut.

Members 36 are shown as being subdivided into unit-lengths with one unit-length engaging each pair of bars at each side thereof. The unit-lengths of subdivided members 36 have overlapping portions to form the joints illustrated at 34, and a bolt 38 extends through each such joint. The outer pieces 36a and 36c differ from each other, and intermediate piece 36b differs from both of those, to the extent required by the lap-joint formations. The advantage of making member 36 in the subdivided form illustrated is that it enables additional members 36b to be added so as to extend the total length of the member 36 and thereby accommodate additional pairs of conductors where this is required. A three-phase system employing three pairs of bars as illustrated might easily require an additional bus bar or two for a half-neutral or for a full-neutral; or the duct might well be extended to have twelve bars in a heavier-current installation; and this in turn might be extended to include any number of neutrals. With each such extension, additional pieces 36b would be added.

It should be understood that the subdivision of the frame members 36, while advantageous, is not essential, for members 36a, 36b, and 36c are contemplated to be made as an integral element, further integral with channels 40. Where members 36 and 40 are made separate, they can each be formed of an extrusion. However, unitary composite members 36—40 may readily be cast.

Members 36 and 40 are preferably of aluminum or other nonferrous material where the bolts 38 are of a magnetic material, in order to avoid formation of closed magnetic loops about the conductors. Even though the magnetic field associated with the paired conductors is of a low order of magnitude, it is advantageous to avoid such closed-circuit magnetic paths about the paired conductors. Further, the aluminum is an advantage in respect of weight.

An advantageous feature of the invention is that members 36 are of metal, formed with locating recesses 46 (see FIG. 4) for receiving the insulated bus bars. As such, they eliminate the vulnerability of ceramic insulators and the like to mechanical shocks that develop upon occurrence of short-circuits.

In FIG. 4 the bars A' and B" as of copper or aluminum are seen to be wrapped with insulation 48. This insulation for example is a first layer of varnished cambric having an adherent layer of permanently tacky adhesive to maintain good thermal contact with the bus bar for effective heat transfer from the bar for dissipation; and an outer wrapping of cotton tape with like adhesive is applied over the varnished cambric. The wrapping of insulation is used particularly where the enclosing duct is of foraminous metal for efficient ventilation, as of expanded sheet steel, for example. Small patches of insulation are placed between the formed recesses 46 in members 36 and the bus bars. Two layers are shown here, a first layer of rubberized insulation 50 and a further layer 52 of a vulcanized fibre.

Bus bars of the type here involved are ordinarily used at a voltage between 220 and 600 volts. The wrapped insulation, primarily the varnished cambric, provides suitable electrical insulation to withstand this potential. The additional wrapped and isolated insulation 50 and 52 is provided as a precaution against a possible break developing in the wrapped insulation and to absorb mechanical shocks. Such shocks may be expected when momentary short circuits are imposed on the bus bars, depending on phase relationships, heavy short-circuit currents in the paired bus bars ordinarily tend to repel one another.

The metal frame represented by the bolts 38 and the assembled metal frame members 36—40 is admirably well suited to resist short circuit stresses developed between the bus bars, in a manner superior to any molded or ceramic insulator such as has heretofore been used for this purpose. This frame is self-supporting and maintains the bus bars in the required arrangement without reliance in any way on the enclosing bus duct. Moreover, when the bolts are tightened suitably, the possibility of the bus bars sliding lengthwise relative to the frames or to each other is virtually eliminated.

A series of channels 54 are united as by welding to the top and bottom covers 20 and 22 of the duct for receiving and locating the bar-gripping frames 36—38—40—42. By this means, the bus bar assemblies are prevented from endwise shifting within the duct so as to preserve the initial assembly of the unit lengths of duct for installation despite normal hazards of handling, and further to resist the heavy weight of the bars in the case of vertical riser applications of the bus duct.

The foregoing illustrative description of the invention as applied to the particular embodiment shown in the drawings is naturally susceptible of variation and varied substitution and application by those skilled in the art and, accordingly, the appended claims should be broadly construed in a manner consistent with the full spirit and scope of the invention.

What I claim is:

1. An electrical bus duct including multiple bus bars, an enclosing duct about said bars, and a number of orienting frame structures fixing the bus bars in relation to each other and to the duct, said structures including a pair of transverse members of metal having individual grooves for receiving the several bus bars, tie-bolts pulling said members into gripping relationship with said bus bars, and layers of flexible insulation interposed between said bars and said members, the respective surfaces of said transverse members which contain said grooves being relatively wide compared to the bus bar thickness so that the pressure against said layers of insulation is distributed along the respective edges of said bus bars and along said layers of insulation.

2. An electrical bus duct including multiple bus bars, a covering of high dielectric-strength insulation on each of said bars, an enclosing duct about said bars, and a number of orienting frame structures fixing the bus bars in relation to each other and to the duct, each of said structures including a pair of transverse members of metal at opposite sides of the bus bars having individual grooves for receiving the respective bus bars, and tensioning elements pulling said members into gripping relationship with said bus bars, and further elements of flexible insulation confined in said grooves, the respective surfaces of said transverse metal members which contain said grooves being relatively wide compared to the bus bar thickness so that the pressure against said covering and said confined elements of insulation is distributed along the edges of the bus bars, respectively.

3. An electrical bus duct including multiple pairs of thin, wide, flat bus bars arranged with their wide faces in successive planes and with their edges aligned, the pairs being widely spaced from each other and the conductors of each pair having about the same face-to-face separation as the bar thickness, an enclosing duct about said bars, and a number of orienting frame structures fixing the bus bars in relation to each other and to the duct, each of said structures including a pair of transverse members of metal at opposite sides of the bus bars having individual grooves for receiving the edges of said bus bars, tensioning elements pulling said members into gripping relationship with said bus bars, and layers of flexible insulation interposed between said bars and said members, the respective surfaces of said transverse metal members which contain said grooves being relatively wide compared to the bus bar thickness so that the pressure against said layers of insulation is distributed along the respective edges of the bus bars.

4. Bus duct including plural pairs of wide and thin bus bars having the wide faces thereof in successive parallel planes and having the edges thereof in substantial alignment, said bus bars being arranged in pairs, said pairs being relatively widely spaced and the bus bars of each pair having their opposed faces spaced approximately by the thickness of the bars and means for holding said bus bars in said spaced relationship including a pair of parallel metal bars disposed opposite each other across opposite edges of said bus bars, said members having respective grooves for said bars individually, layers of flexible insulation separating the bus bars from said grooved metal bars, and tensioning bolts between said grooved bars, said bolts being disposed at opposite sides of each of said pairs of bus bars, the respective surfaces of said parallel metal bars which contain said grooves being relatively wide compared to the bus bar thickness so that the pressure against said layers of insulation is distributed along the edges of the bus bars, respectively.

5. Bus duct in accordance with claim 4 wherein said frame members are of non-ferrous metal.

6. A unit length of bus duct in accordance with claim 4 including channels secured to opposite walls of the bus duct for receiving and locating said metal bars and thereby locating said bus bars against endwise shifting within the duct.

7. An electrical bus duct including multiple bus bars, a covering of high dielectric-strength insulation on each of said bars, an enclosing metal duct about said bars, and a number of orienting frame structures fixing the bus bars in relation to each other and to the enclosing duct, each of said frame structures including a pair of transverse metal members across the edges of the bus bars, said transverse metal members embodying opposed pairs of complementary grooves conforming individually to the respective edges of the several bus bars, a layer of flexible insulation received in each groove and separating the transverse metal members and the covering of insulation on the bus bars, and tensioning elements pulling said members into gripping relation with the bus bars, the respective surfaces of said transverse metal members which contain said grooves being relatively wide compared to the bus bar thickness so that the pressure against said layer and said wrapping of insulation is distributed along the edges of the bus bars, respectively.

References Cited in the file of this patent

UNITED STATES PATENTS

| 2,261,857 | Novak et al. | Nov. 4, 1941 |
| 2,310,919 | Adams | Feb. 16, 1943 |
| 2,868,864 | Page | Jan. 13, 1959 |
| 2,870,240 | Stieglitz | Jan. 20, 1959 |